United States Patent [19]
Dochterman

[11] 3,932,930
[45] Jan. 20, 1976

[54] METHOD OF MAKING DYNAMOELECTRIC MACHINES AND ASSEMBLIES THEREFOR

[75] Inventor: Richard W. Dochterman, Fort Wayne, Ind.

[73] Assignee: General Electric Company, Fort Wayne, Ind.

[22] Filed: Dec. 16, 1974

[21] Appl. No.: 532,868

Related U.S. Application Data

[62] Division of Ser. No. 332,265, Feb. 14, 1973, Pat. No. 3,891,878.

[52] U.S. Cl. ............ 29/596; 29/163.5 F; 184/11 R; 308/89 R; 308/132; 310/90
[51] Int. Cl.² ...................................... H02K 15/14
[58] Field of Search .......... 29/596, 163.5 F; 310/90; 308/132, 89 R; 184/11 R

[56] References Cited
UNITED STATES PATENTS

| | | | |
|---|---|---|---|
| 2,195,814 | 4/1940 | Gibbs | 308/89 R |
| 2,402,565 | 6/1946 | Madsen | 308/125 |
| 2,600,353 | 6/1952 | Wightman | 308/163 |
| 2,736,623 | 2/1956 | Beason | 308/89 R |
| 2,752,208 | 6/1956 | Wightman | 308/171 |
| 2,945,729 | 7/1960 | Mitchell | 308/132 |
| 2,960,371 | 11/1960 | Staak | 308/132 |
| 3,017,698 | 1/1962 | Hambrecht et al. | 29/163.5 F |
| 3,048,454 | 8/1962 | Irvin | 308/36.4 |
| 3,184,272 | 5/1965 | Ridgway, Jr. | 308/132 |
| 3,434,765 | 3/1969 | Abel | 308/132 |
| 3,625,577 | 12/1971 | Coleman | 308/36.4 |
| 3,703,221 | 11/1972 | Merkle et al. | 308/187.1 |

*Primary Examiner*—Carl E. Hall
*Attorney, Agent, or Firm*—Ralph E. Krisher, Jr.

[57] ABSTRACT

Lubrication system includes lubricant reservoir that contains an extrudable base material impregnated with lubricant, such as oil. Motor parts, including the reservoir defining parts, are readily assembled with one another and retaining means is provided that permits the efficient transfer of oil to extrudable base material, but prevents inadvertent movement of base material away from a predetermined locale in reservoir. In one illustrated form, such means are in the form of a plastic member or basket having perforations therein of a size to restrict the movement of extrudable base material therepast and yet promote the movement of oil into the predetermined locale. In another form a retainer member is fabricated from a lanced and expanded metallic material that forms a perforated base material retainer or basket. Retainer may be collapsed to permit accommodation thereof in reservoirs of various lengths, and reduce the need to stock differently sized retainers for machines having different reservoir dimensions. Method includes extruding material quickly through a plurality of extrusion openings, so as to reduce tendency to form air pockets or voids within reservoir and reduce filling time; and restricting free flow or movement of the extruded material with a perforated or foraminous wall.

5 Claims, 5 Drawing Figures

METHOD OF MAKING DYNAMOELECTRIC MACHINES AND ASSEMBLIES THEREFOR

RELATED APPLICATION

This application is a division of my copending application Ser. No. 332,265 which was filed on Feb. 14, 1973, now U.S. Pat. No. 3,891,878, and which is incorporated herein by reference.

BACKGROUND OF THE INVENTION

This invention relates generally to dynamoelectric machines and, more particularly, to methods for manufacturing a lubrication system for such machines having new and improved bearing lubrication systems.

In rotating dynamoelectric machines, e.g., motors, generators, and alternators; a rotatable member is supported by one or more bearing devices for rotation relative to a stationary member. Such bearing devices or systems may be, for example, of the rolling bearing type (e.g., ball bearings) or of the journal bearing type (e.g., sleeve bearings). Although the principles of the invention described herein may be used to advantage with either of these types of systems, the detailed description will proceed with particular reference to dynamoelectric machines of the sleeve bearing type and the invention will be discussed in connection with embodiments illustrated as fractional horsepower sleeve bearing machines.

It will be understood that, for satisfactory operation over long periods of time (e.g., for a number of years), means must be provided that will maintain an adequate supply and flow of lubricant to a sleeve bearing.

Common approaches heretofore have included the provision of lubricant storage and feeding means that store a supply of lubricating material, such as oil, and that provide a supply of oil for a bearing during motor operation. After the oil has moved along bearing surfaces during operation, the oil has then recirculated to the lubricant reservoir. For many years, lubricant reservoir cavities have been designed to accommodate materials such as felt. This felt absorbs and thus stores oil that could later be wicked or fed to a bearing during motor operation. More recently, materials have been developed which may be injected or otherwise very quickly disposed in a lubricant reservoir cavity adjacent to a motor bearing, and such materials then also are relied upon (with or without felt feed wicks) to feed oil to the motor bearing during operation. One of the materials that has been used heretofore is described for example in M. L. Abel U.S. Pat. No. 3,434,765 and the same type of material is referred to in Ridgway U.S. Pat. No. 3,184,272.

The particular material mentioned in the Abel and Ridgway patents is marketed under the name "PERMAWICK" by the Permawick Company of Detroit, Mich. Other approaches utilize the type of lubricating material or materials of the type described either in Staak U.S. Pat. No. 2,979,779 or James Whitt's applications Ser. Nos. 292,664 and 292,550 (both now abandoned); both of which were titled "Extrudable Lubricant" and were assigned to the assignee of this application. The use of any of these types of materials may contribute to reduced labor costs associated with manufacturing motors, but problems have been encountered due to the difference in the physical nature and characteristics between felt materials and extrudable lubricant materials.

For example, there is a tendency for extrudable materials to flow into portions of lubricant defining reservoirs other than those selected to be filled with such material; whereas pieces of felt tend to stay where they have been placed. In addition, much care must be taken to ensure that extrudable materials do not obstruct or interfere with oil recirculating means such as oil slingers. Even when this has been done, however, the tire required to fill a reservoir with extrudable lubricant has been relatively long because only one, or at most two, extrusion ports have been used during filling of such reservoirs. Accordingly, it would be desirable to provide dynamoelectric machines having a new and improved lubrication system, and mehtods to be used when making or manufacturing the same that would overcome problems mentioned above as well as other problems that will become more apparent from the following disclosure.

SUMMARY OF THE INVENTION

Accordingly, it is a general object of the present invention to provide new and improved methods for use in the manufacture of dynamoelectric machines that utilize extrudable lubricants.

It is another object of the present invention to provide a method of manufacturing a new and improved lubrication system in a dynamoelectric machine whereby extrudable lubricant storage materials may be quickly and controllably placed and reliably used in practice.

A more specific object of the present invention is to provide new and improved methods of assembling electric motors and parts thereof that include means for retaining an extrudable base material in a predetermined locale but that encourage the circulation of oil to the extrudable base material.

In carrying out the above and other objects in a preferred form thereof, I provide methods of assembling lubrication systems for fractional horsepower motors of the sleeve bearing type, and wherein an end shield, in conjunction with other parts, establishs a lubricant reservoir that contains an extrudable base material that provides a storage means for a lubricant, such as oil. The parts of the motor, including the reservoir defining parts, may be readily assembled with one another and retaining means is provided that permits the efficient transfer of oil to the extrudable base material, but prevents inadvertent movement of such base material away from a predetermined locale. In one illustrated form, such means are in the form of a plastic mesh member or basket having perforations therein of a size to restrict the movement of extrudable base material therepast and yet promote the movement of oil into the predetermined locale. In another illustrated form, such means is in the form of a mesh retainer member fabricated from a lanced and expanded metallic material that forms a perforated base material retainer or basket. In both forms, the basket may be collapsible to permit accommodation thereof in reservoirs of various lengths, so as to eliminate the need to stock differently sized retainers for machines having different reservoir dimensions. In carrying out steps of one preferred method, I extrude material quickly through a plurality of extrusion openings, so as to reduce the tendency to form air pockets or voids within the reservoir and to reduce filling time; and restrict the free flow or movement of the extruded material with a perforated or foraminous wall.

The subject matter which I regard as my invention is particularly pointed out and distinctly claimed in the concluding portion of the specification. The invention itself however, both as to its organization, mode of operation, and preferred practice; together with further advantages thereof, may best be understood by reference to the following description taken in conjunction with the accompanying drawings.

DESCRIPTION OF THE PREFERRED EMBODIMENTS

Figure 1:
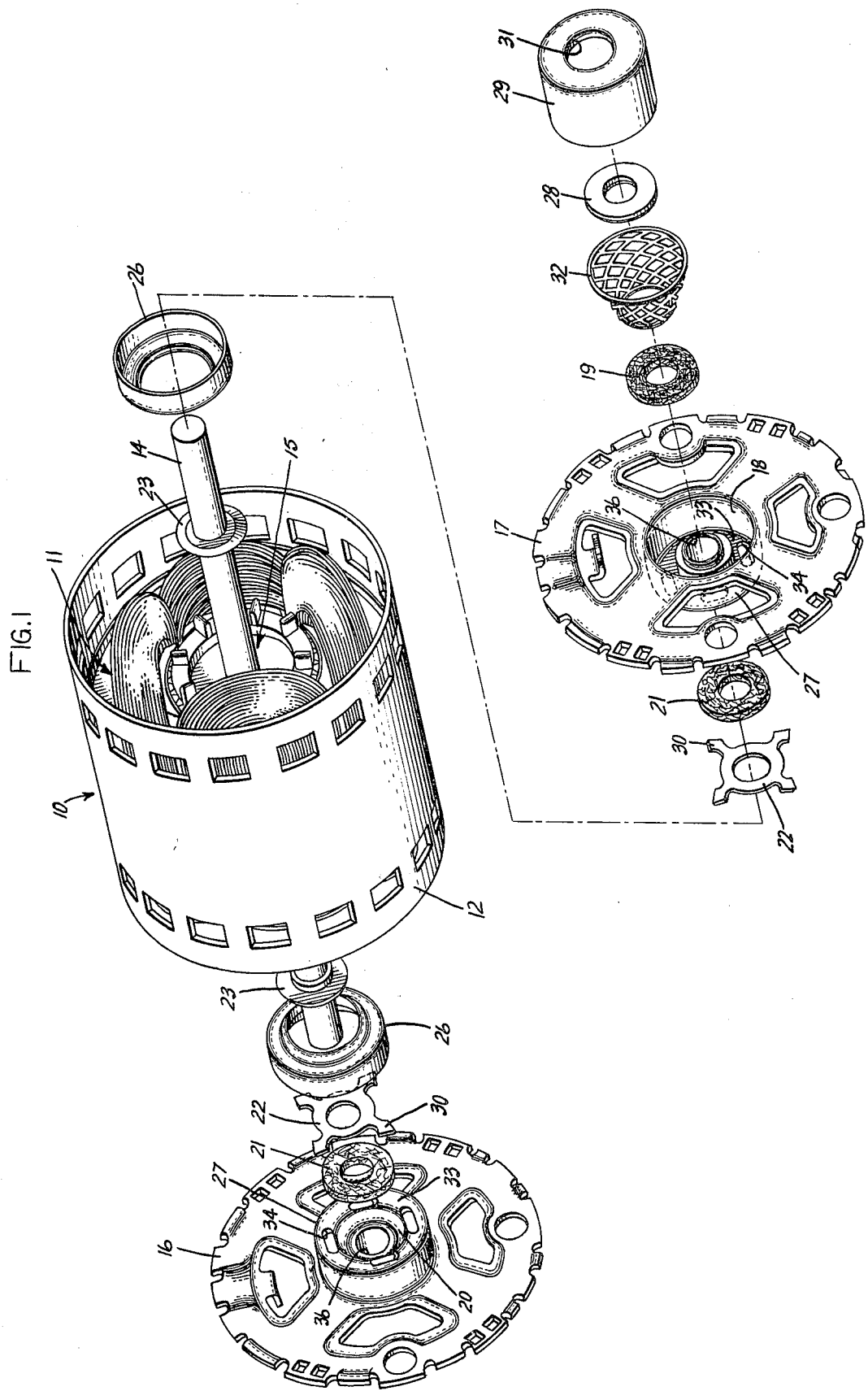
FIG. 1 is an exploded perspective view of a fractional horsepower induction motor that may be manufactured when practicing the invention in one form.

Turning now to the drawings in more detail, I have shown a fractional horsepower motor 10 that includes a conventional wound stator core assembly 11, a case or housing 12, and a rotor assembly 15 which includes a short-circuited squirrel cage winding supported on a laminated magnetic core, and a shaft 14. The motor also includes a pair of end frames, end shields, or end bells (these terms being used interchangeably in the art) denoted by the reference numerals 16, 17. The end frames 16, 17 may be die cast, stamped, or formed in any other convenient manner and they may be substantially identical to one another as shown; although it will be appreciated that if the shaft 14 is to extend through only one of the end frames, the other of the end frames may be provided with a solid cap or solid wall in line with the end of the shaft.

A cavity 18 in the end frame 17 is readily apparent from FIG. 1 and, it is in this cavity that felt shaft wicks 19, retainer 32, and oil throwers or slingers 28 will be positioned after assembly of the motor. Each end frame also at least partly defines a cavity 20 that accommodates a felt wick 21, thrust member 22, and shaft mounted thrust collar 23.

The other parts shown in FIG. 1 include interior end caps 26 that are pressed onto a hub 27 of each end shield so as to assist in defining cavity 20 and so as to trap the thrust members 22 against the hub 27; and end caps 29. The oil throwers 28 may be of any desired construction and material, although a laminated plastic and synthetic rubber construction has been illustrated.

If the shaft 14 is not intended to extend through the end shield 16, the not shown end cap used in conjunction with end shield 16 will not be provided with a shaft accommodating hole such as the hole 31 in the illustrated end cap 29.

The reservoir cup or basket 32 could be molded from any suitable plastic material including nylon, polyvinyl chloride, etc., as will be explained hereinafter. However, the basket 32 of FIGS. 1 and 2 is formed from a sheet of about 0.025 of an inch thick aluminum as will be explained hereinafter in conjunction with FIG. 5.

Figure 2:
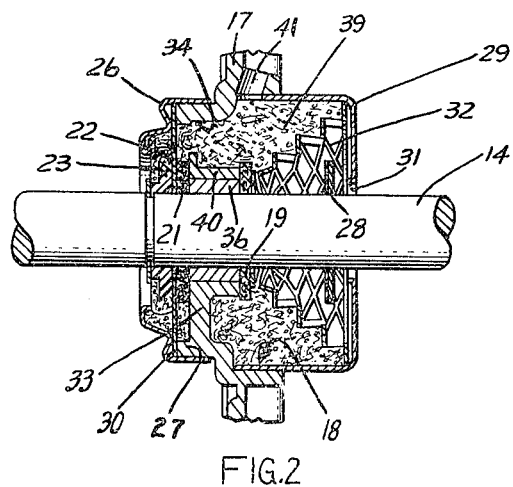
FIG. 2 is a side elevation, with parts in section, parts removed, and parts broken away, showing the relationship of parts of the motor of FIG. 1 after it has been assembled and lubricated.

Lubricant retaining material has not been shown in FIG. 1 for ease of illustration, but an extrudable lubricating material containing cellulose fibers of the type described in the above-referenced Abel patent has been shown in FIG. 2, along with the parts associated with the lubrication system for the bearing 36. A bearing 36, of course is supported by each of the end frames; although it should be expressly understood that the present invention may be practiced when making single or "unit" bearing type motors.

With reference now to FIG. 2, one convenient method of assembly includes positioning the oil wick 19 against the end face of the bearing 36 (the hub 40 of end frame 17 holding such bearing), positioning basket 32 in concentric relationship within the cavity 18 of end frame 17, and then pressing the end cap 29 into place relative to the end frame. It will be noted that the parts preferably are dimensioned so that a relubricating passage 41 is left unobstructed.

Either before or after the just described procedures, the oil wick 21 is positioned against an end face of bearing 36, thrust member 22 is positioned so that the arms 30 thereof do not overlie the openings 34 in the end frame 17, and cover 26 is pressed into place. Since the arms 30 are positioned against the solid material webs 33 of the end frame, openings 34 establish four spaced apart ports through which lubricating material may be extruded later.

With the cover 26 pressed onto the hub 27 of the end frame 17, an end frame subassembly is formed that is ready for injection of an extrudable lubricant material. Preferably, this is done with an extruding nozzle designed to supply extrudable lubricant through each of the openings 34 in the end frame 17 by forcing the extrudable lubricating material into the lubricant reservoir under pressure. The extruded lubricating material so placed has been denoted by the reference numeral 39 in FIG. 2.

Thereafter, the shaft 14 (with the rotor body and thrust member 23 previously assembled therewith as will be understood) is inserted through the opening of the oil well cover 26, the leading end of the shaft 14 (the right hand end thereof as viewed in FIG. 2) slides through the bearing 36, oil wick 19, oil thrower 28, and through the opening 31 in cover or cap 29. The hole in the thrower 28 is sized so that the thrower 28 will have a friction, but slip fit on shaft 14. After the rotor and end frame assemblies have been assembled together, the oil thrower 28 can be moved to a desired position on shaft 14 as shown in FIG. 2 by a small tool that is slipped through the opening 31 so as to slide the thrower 28 along the shaft 14 toward bearing 36. There is sufficient frictional engagement between shaft 14 and oil thrower 28 to prevent subsequent undesired and inadvertent axial movement of the thrower 28 along shaft 14 during motor operation.

The walls of cup 32 keep the extrudable base material within a predetermined locale of cavity 18 as shown in FIG. 2. The interior of cup or retainer 32 is substantially free of extrudable base material, and, for ease of description, this interior region will be referred to hereinafter as an "oil slinger cavity". The retainer 32 provides the additional advantage of holding oil wick 19 in a desired predetermined position at the end of the double end feed sleeve bearing 36; it being understood that in the FIG. 2 arrangement; oil will be fed to each end of bearing 36. However, it should be clearly understood that bearing 36 could be of the center feed variety and a window may be provided in the bearing mounting hub 40 so as to facilitate such feed. The retainer 32 also holds wick 19 from rotation with shaft 14 and thus assures that oil will be wicked to bearing 36.

The holes in the retainer 32 are about one-tenth of an inch maximum as measured in any direction and readily permit the return of oil from slinger 28 to the lubricant retaining mass 39. The size of the openings in the cup or basket 32 are, however, sufficiently small to prevent the extrudable base material of mass 39 from being extruded therethrough while cavity 18 is being filled with the desired predetermined amount of lubricating material.

It should be noted that while the showing of FIG. 2 is substantially accurate, the view actually represents a diagonal cut taken through the end frame 17 so as to show the relationship of an opening 34 therein as well as a solid portion 33 in the same view.

Figure 5:
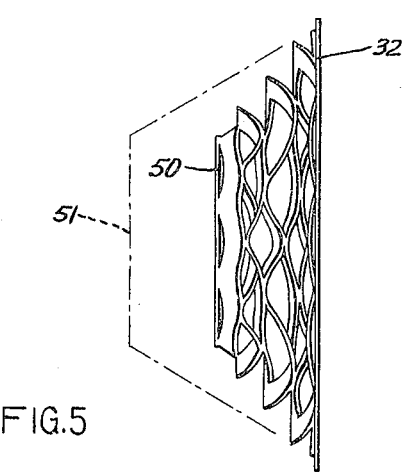
FIG. 5 is a side elevation of the retaining means shown in FIGS. 1 and 2.

The retainer 32 is shown to an enlarged scale in FIG. 5. Retainer 32 is made from sheet aluminum by lancing the sheet and punching a shaft admitting hole therein. Thereafter, the sheet is expanded in known fashion until the end 50 thereof coincides with the segment 51 of the phantom line shown in FIG. 5. Desirably, the overall expanded size of retainer 32 as measured in a direction along the axis of shaft 14 would be greater than the space in which the retainer 32 is to be finally positioned. In this manner, it can be assured that compressive forces will be applied to the retainer after assembly so as to ensure that the oil feed wick 19 will be pressed against the end face of the bearing 36.

Retainer 32 can be made of a sufficiently large size that it will be properly assembled with the largest physical size of motor and bearing system in which it is contemplated that retainer 32 will be used. Then, for motors having smaller dimensions, or lubricant reservoirs having smaller dimensions, the retainer 32 may be collapsed to the configuration shown in FIG. 5 and be useable without problem in such smaller motors. This technique eliminates the need to provide retainers of different sizes for differently sized motors. While specific reference has been made to aluminum as the material from which retainer 32 may be fabricated it will be appreciated that the cup could be formed of substantially any other ferrous or non-ferrous material that is suitable for use in lubricant retaining systems. A more detailed description of the specific techniques used to lance and expand the retainer 32 is not here presented, since those techniques are known in the metal fabricating art.

Figure 3:
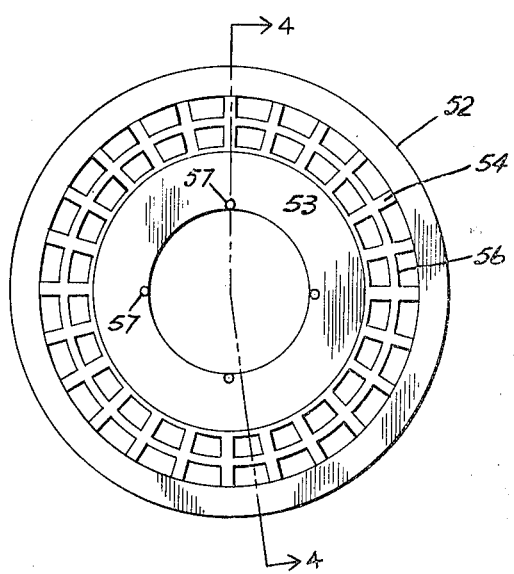
FIG. 3 is an end elevation of one form of retaining means that may be used in lieu of the retaining means shown in FIGS. 1 and 2.
Figure 4:
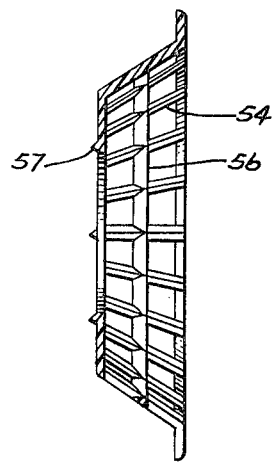
FIG. 4 is a view taken along the lines in the direction of arrows 4—4 in FIG. 3.

Turning now to FIGS. 3 and 4, I have there shown another basket or retainer 52 which has been molded from a plastic material. More specifically, the cup 52 was molded from polyvinyl chloride although other suitable synthetic materials may be used. Preferably, the retainer 52 will be of a sufficient size to ensure that an oil feed wick adjacent to the face 53 thereof will not rotate with a motor shaft. However, this obviously is not critical and, particularly is not critical in those applications where end feed bearings are not used or in those applications where end oil wicks corresponding to oil wicks 19 and 21 are not provided.

The retainer 52 shown in FIGS. 3 and 4 may also be axially compressed or shortened in the same manner as has been described in conjunction with FIG. 5, although the range of adjustment of plastic members generally would not be expected to be as great as that which may be accomplished with expanded metal structures; even though polyvinyl chloride may be extremely flexible and member 52 can, essentially, be turned inside out without breaking or tearing the interconnecting webs 54, and 56.

When the retainer 52 is formed by molding from a plastic material it may be convenient to provide projections or tabs 57 at spaced apart locations thereon. These then may be used to advantage to prevent rotation of an oil feed wick 19 because projections 57 will impinge on a relatively soft wool felt wick. Similar means may be provided in the form of pierced or lanced regions along the end face 50 of the retainer 32.

It should be apparent to those skilled in the art that while I have described herein what at present are considered to be preferred modes of practicing my invention in accordance with the Patent Statutes, changes may be made in the methods disclosed without actually departing from the true spirit and scope of the invention; and I therefore intend to cover in the following claims all such equivalent variations as fall within the invention.

What I claim as new and desire to secure by Letters Patent of the U.S. is:

1. A method of manufacturing an end frame assembly for a dynamoelectric machine having a lubricant reservoir and an extrudable lubricant retaining mass therein, the method comprising assembling together an end frame and a foraminous walled retainer, and thereby establishing a predetermined locale for a lubricant retaining mass on a first side of the formainous walled retainer and an oil slinger cavity on the other side of the foraminous walled retainer; extruding an extrudable lubricant retaining mass through at least two extrusion apertures in the end frame into the predetermined locale determined at least in part by the end frame and at least in part by the foraminous wall of the retainer; and restricting the flow of the extrudable lubricant retaining mass beyond the foraminous wall of the retainer while performing the extruding step.

2. A method of manufacturing an end frame assembly for a dynamoelectric machine having a lubricant reservoir with an extrudable lubricant retaining mass therein, the method comprising assembling together a retainer and at least first and second members to at least partly define a cavity for the extrudable lubricant retaining mass, and to define an oil slinger cavity with the retainer disposed between spaced apart portions of the first and second members; positioning together the first member and an extruding mechanism; extruding a lubricant retaining mass through a plurality of spaced apart apertures in the first member until the cavity between the retainer and first member is substantially filled by the lubricant retaining means; and restricting movement of the lubricant retaining mass past the retainer during the extruding step.

3. The method of claim 2 wherein the retainer is basket shaped and has perforations therein for permitting passage of lubricant therethrough, and further including applying compressive forces to the basket shaped retainer while assembling together the retainer and the at least first and second members.

4. The method of claim 2, further including at least partially collapsing the retainer while assembling together the retainer and the at least first and second members.

5. A method of manufacturing an end frame assembly for a dynamoelectric machine having a lubricant reservoir and an extrudable lubricant retaining mass therein, the method comprising: positioning an oil feeding wick in a predetermined position relative to a bearing in the end frame; locating a retaining member to at least partially define a locale for storing the lubricant retaining mass, and holding the feeding wick in a desired position with the retaining member; pressing an end cap over the perforated retaining member into fixed relationship with the locale thereby further defining the locale; extruding an extrudable lubricant retaining mass into the locale and against the retaining member; and preventing the extrudable lubricant retaining mass from passing beyond the locale with the retaining member.

* * * * *